United States Patent
Bai

(10) Patent No.: US 8,417,102 B2
(45) Date of Patent: Apr. 9, 2013

(54) MACHINE-IMPLEMENTED AUTHORING METHOD FOR A HIGH DEFINITION DIGITAL VERSATILE DISC, AND A COMPUTER READABLE STORAGE MEDIUM FOR IMPLEMENTING THE SAME

(75) Inventor: Sheng-Wen Bai, Kaohsiung Hsien (TW)

(73) Assignee: Corel Corporation, Ottawa (CA)

( * ) Notice: Subject to any disclaimer, the term of this patent is extended or adjusted under 35 U.S.C. 154(b) by 1062 days.

(21) Appl. No.: 11/856,114

(22) Filed: Sep. 17, 2007

(65) Prior Publication Data

US 2008/0193105 A1    Aug. 14, 2008

(30) Foreign Application Priority Data

Feb. 14, 2007    (TW) ............................... 96105530 A

(51) Int. Cl.
*H04N 5/84*    (2006.01)
(52) U.S. Cl.
USPC ......................................... 386/335; 386/326
(58) Field of Classification Search .................. None
See application file for complete search history.

(56) References Cited

U.S. PATENT DOCUMENTS

| | | | | |
|---|---|---|---|---|
| 2002/0112226 A1* | 8/2002 | Brodersen et al. | ............ | 717/140 |
| 2002/0194618 A1* | 12/2002 | Okada et al. | .................. | 725/132 |
| 2003/0237016 A1* | 12/2003 | Johnson et al. | .................... | 714/4 |
| 2006/0195521 A1* | 8/2006 | New et al. | ...................... | 709/204 |
| 2007/0192353 A1* | 8/2007 | Wang et al. | .................... | 707/102 |
| 2007/0206926 A1* | 9/2007 | Ando et al. | ...................... | 386/95 |

\* cited by examiner

*Primary Examiner* — William C Vaughn, Jr.
*Assistant Examiner* — Eileen Adams
(74) *Attorney, Agent, or Firm* — Pillsbury Winthrop Shaw Pittman LLP

(57) ABSTRACT

A machine-implemented authoring method for a high definition digital versatile disc includes: receiving a user-specified title; enabling a user to specify an initial playlist file and at least one application, the initial playlist file being one of a template-generated raw playlist file and a user-authored raw playlist file; and in response to a user-inputted command, modifying the initial playlist file to set corresponding relationship between the user-specified title and the at least one application such that, during playback of the user-specified title, the at least one application set to correspond to the user-specified title can be invoked and executed.

30 Claims, 5 Drawing Sheets

| title01 | title02 | title03 | title04 | title05 |
|---------|---------|---------|---------|---------|
| app1    | app1    |         |         |         |
|         |         |         | app2    | app2    |
| app3    | app3    | app3    | app3    | app3    |

0 → Time

91 — 
```
<ApplicationSegment src="file:///dvddisc/ADV_OBJ/app1.xmf">
  <ApplicationResource src="file:///dvddisc/ADV_OBJ/app1.xmf"/>
  <ApplicationResource src="file:///dvddisc/ADV_OBJ/app1.xmu"/>
</ApplicationSegment>
```

92 — 
```
<ApplicationSegment src="file:///dvddisc/ADV_OBJ/app1.xmf">
  <ApplicationResource src="file:///dvddisc/ADV_OBJ/app1.xmf"/>
  <ApplicationResource src="file:///dvddisc/ADV_OBJ/app1.xmu"/>
</ApplicationSegment>
```

93 —

94 — 
```
<ApplicationSegment src="file:///dvddisc/ADV_OBJ/app2.xmf">
  <ApplicationResource src="file:///dvddisc/ADV_OBJ/app2.xmf"/>
  <ApplicationResource src="file:///dvddisc/ADV_OBJ/app2.xmu"/>
</ApplicationSegment>
```

95 — 
```
<ApplicationSegment src="file:///dvddisc/ADV_OBJ/app2.xmf">
  <ApplicationResource src="file:///dvddisc/ADV_OBJ/app2.xmf"/>
  <ApplicationResource src="file:///dvddisc/ADV_OBJ/app2.xmu"/>
</ApplicationSegment>
```

90 — 
```
<PlaylistApplication src="file:///dvddisc/ADV_OBJ/app3.xmf">
  <PlaylistApplicationResource src="file:///dvddisc/ADV_OBJ/app3.xmf"/>
  <PlaylistApplicationResource src="file:///dvddisc/ADV_OBJ/app3.xmu"/>
</PlaylistApplication>
```

FIG. 2

MACHINE-IMPLEMENTED AUTHORING METHOD FOR A HIGH DEFINITION DIGITAL VERSATILE DISC, AND A COMPUTER READABLE STORAGE MEDIUM FOR IMPLEMENTING THE SAME

CROSS-REFERENCE TO RELATED APPLICATION

This application claims priority of Taiwanese Application No. 096105530, filed on Feb. 14, 2007.

BACKGROUND OF THE INVENTION

1. Field of the Invention

The invention relates to an authoring method and a storage medium, more particularly to a machine-implemented authoring method for a high definition digital versatile disc (HD DVD) and a computer readable storage medium including program instructions for causing a computing apparatus to execute consecutive steps of the machine-implemented authoring method.

2. Description of the Related Art

A standard Digital Versatile Disc (DVD) formatted optical disc (also referred to as a DVD disc) is widely used as an audiovisual storage medium due to its ability to store high quality images and lengthy video clips owing to its high storage capacity.

During playback of a DVD disc, a user can operate a remote controller of a DVD player so as to adjust various playback parameters of the DVD disc via a "menu" button on the remote controller. The playback parameters control playback settings of the DVD disc, including, for instance, playback video quality, sound effects, turning subtitles on/off, position of subtitles, language selection, or chapter selection.

When a user presses the "menu" button, a video currently being played is interrupted, and a menu is displayed to facilitate user adjustment of the playback parameters. After the adjustments are completed, the user needs to press a "play" button on the remote controller in order to start a new playback sequence. Since the video is interrupted when adjustments of the playback parameters are made, interaction between the user and playback of the DVD disc is cumbersome and inconvenient.

A High Definition Digital Versatile Disc (HD DVD) format, a successor to the standard DVD format, has been developed with improved interactivity between the user and the playback of the HD DVD disc. In other words, a video currently being played need not be interrupted and paused when adjustments of playback parameters of the HD DVD disc are made by the user.

An advanced HD DVD disc includes two directories named ADV_OBJ and HVDVD_TS, respectively. Stored in the HVDVD_TS directory is a set of titles, each of which has a corresponding set of time map files for composing images and/or videos of the title. The time map files compose images or videos compliant with the HD DVD format. Stored in the ADV_OBJ directory is an interactive HD DVD content, normally referred to as an "HDi content" (hereinafter referred to as the interactive content).

An initial title is, for example, a warning screen declaring copyright of the HD DVD disc. Normally, after the initial title and prior to a primary title, there is a preview title for introducing upcoming HD DVD discs by the content provider. The preview title is frequently divided into multiple preview sub-titles so as to facilitate the audience in skipping those preview sub-titles not of interest to the audience. During playback of the HD DVD disc, titles are played sequentially in a seamless manner such that the audience is unaware of the beginning and end of each title.

The interactive content defines the interactivity with the audience while the title is being played. While playing a title, the interactive content is capable of displaying various prompt messages on the screen, and of defining screen size and color of the prompt messages, so as to direct the audience in making corresponding interactive activities. In addition, the interactive content is capable of receiving playback parameter settings from the audience, and of adjusting the playback of the title according to the playback parameters thus set. The playback of the title is neither interrupted nor paused while the interactivity is in progress.

The interactive content includes an application and a playlist file (filename extension .xpl). It should be noted that the interactive content can also be chosen to have no application. During playback of a HD DVD disc, the playlist file is first read, and the titles are played according to the playlist file. The playlist file stores the playback order of the titles and relevant information of corresponding applications for each title. The application is capable of receiving a set of playback parameters during playback of the corresponding title, and/or displaying prompt messages. Through executing corresponding applications during playback of each title, real-time interactivity is achieved between the audience and the title being played.

Take a simple example as an illustration, FIG. 1 shows corresponding relationships between the titles and the applications of a HD DVD disc, starting at time 0. The HD DVD disc includes a set of titles and an interactive content. There are five titles in total (respectively named first title title01 to fifth title title05), and the order of playback for the titles is from the first title title01 to the fifth title title05. The interactive content includes a first application app1, a second application app2, a third application app3, and a playlist file.

During playback of every title, the third application app3 is executable. Therefore, the third application app3 corresponds to the whole playlist, and is often referred to as a "playlist application". In addition, during playback of the first and second titles title01, title02, the first application app1 is executable, and during playback of the fourth and fifth titles title04, title05, the second application app2 is executable, where each of the first and second applications app1, app2 is referred to as a "title application". Consequently, the first application app1 corresponds to the first and second titles title01, title02, while the second application app2 corresponds to the fourth and fifth titles title04, title05.

Each application includes a set of include files, which define functions performed by the application. The set of include files includes at least a markup file (filename extension .xmu) and a manifest file (filename extension .xmf). In addition, the set of include files may also include some resource files, such as a script file (filename extension .js), etc.

The playlist file records filenames and locations of the time map files, and includes a playlist parameter segment and a set of title parameter segments corresponding in number to the titles. The playlist parameter segment stores a set of include parameters, whose values correspond to the names and the locations of the include files of the applications that correspond to the playlist. Each title parameter segment stores a set of include parameters, whose values correspond to the names and the locations of the include files of the application or applications corresponding to the title.

Since the playlist file records the order of playback of the titles and the corresponding applications for each title, it is necessary for the file names and the locations of the include files of the applications, as well as those of the time map files of the titles to be listed correctly in the playlist file, such that during playback of the HD DVD disc, the time map files of the titles and the include files of the applications respectively facilitate playback of the videos associated with the titles and control of the interactivity between the audience and the video playbacks.

Referring back to the example provided with reference to FIG. 1, assume that the first application app1 includes include files app1.*xmu* and app1.*xmf*, the second application app2 includes include files app2.*xmu* and app2.*xmf*, and the third application app3 includes include files app3.*xmu* and app3.*xmf*. Then, parts of the playlist file would be such as that shown in FIG. 2.

Referring to FIG. 2, the playlist file includes a playlist parameter segment 90 for storing include parameters for the whole playlist, a first title parameter segment 91 for storing include parameters for the first title title01, a second title parameter segment 92 for storing include parameters for the second title title02, a third title parameter segment 93 for storing include parameters for the third title title03, a fourth title parameter segment 94 for storing include parameters for the fourth title title04, and a fifth title parameter segment 95 for storing include parameters for the fifth title title05.

Because the third application app3 is the "playlist application" and corresponds to the whole playlist, the playlist parameter segment 90 stores a set of include parameters having values that correspond to the names and the locations of the include files app3.*xmf*, app3.*xmu* included in the third application app3. Similarly, since the first application app1 corresponds to both of the first and second titles title01 and title02, the first and second title parameter segments 91, 92 each stores a set of include parameters having values that correspond to the names and the locations of the include files app1.*xmf*, app1.*xmu* included in the first application app1. Likewise, since the second application app2 corresponds to both of the fourth and fifth titles title04 and title05, the fourth and fifth title parameter segments 94, 95 each stores a set of include parameters having values that correspond to the names and the locations of the include files app2.*xmf*, app2.*xmu* included in the second application app2. Furthermore, since none of the applications corresponds specifically to the third title title03, no include parameters having values that correspond to the names and the locations of the include files of any of the applications app1, app2, app3 are stored in the third title parameter segment 93.

Having briefly introduced the contents and standard format of a HD DVD disc, it should be noted that the applicant is unaware of a commercially available software tool to facilitate authoring of the HD DVD content by consumers.

SUMMARY OF THE INVENTION

Therefore, the object of the present invention is to provide a machine-implemented authoring method for a high definition digital versatile disc (HD DVD).

Another object of the present invention is to provide a computer-readable storage medium that includes program instructions for causing a computing apparatus to execute consecutive steps of the machine-implemented authoring method for a HD DVD disc so as to facilitate authoring of HD DVD content by consumers.

According to one aspect of the present invention, there is provided a machine-implemented authoring method for a high definition digital versatile disc (HD DVD). The machine-implemented authoring method includes:

a) receiving a user-specified title;

b) enabling a user to specify an initial playlist file and at least one application, the initial playlist file being one of a template-generated raw playlist file and a user-authored raw playlist file; and c) in response to a user-inputted command, modifying the initial playlist file to set corresponding relationship between the user-specified title and said at least one application such that, during playback of the user-specified title, said at least one application set to correspond to the user-specified title can be invoked and executed.

According to another aspect of the present invention, there is provided a machine-implemented authoring method adapted for use when adding an application to a high definition digital versatile disc project, the project including at least one title and a playlist file. The machine-implemented authoring method includes:

a) receiving the application; and b) in response to a user-inputted command, setting a corresponding relationship between the application and one of the title and a playlist in the playlist file.

According to yet another aspect of the present invention, there is provided a machine-implemented authoring method for a high definition digital versatile disc. The machine-implemented authoring method includes:

a) enabling a user to specify at least one text file, wherein an attribute of a corresponding title is represented by a keyword in said at least one text file;

b) receiving different titles; and c) in response to a user-inputted command, updating occurrences of the keyword in said at least one text file with actual value of the attribute of the corresponding title.

According to still another aspect of the present invention, there is provided a computer-readable storage medium that includes program instructions for causing a computing apparatus to execute consecutive steps of the machine-implemented authoring method for a high definition digital versatile disc (HD DVD).

BRIEF DESCRIPTION OF THE DRAWINGS

Other features and advantages of the present invention will become apparent in the following detailed description of the preferred embodiments with reference to the accompanying drawings, of which:

FIG. 2 is a schematic diagram of an example playlist file, illustrating include parameters of a playlist parameter segment and a plurality of title parameter segments of the example playlist file;

DETAILED DESCRIPTION OF THE PREFERRED EMBODIMENTS

Figure 1:
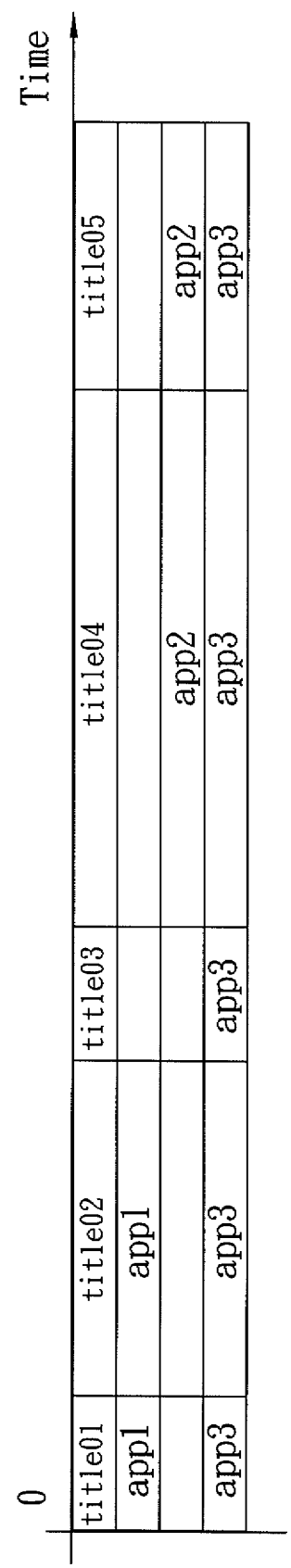
FIG. 1 is a schematic diagram to illustrate corresponding relationships between a plurality of titles and a plurality of applications of a HD DVD disc.

Before the present invention is described in greater detail, it should be noted that like elements are denoted by the same reference numerals throughout the disclosure.

Figure 3:
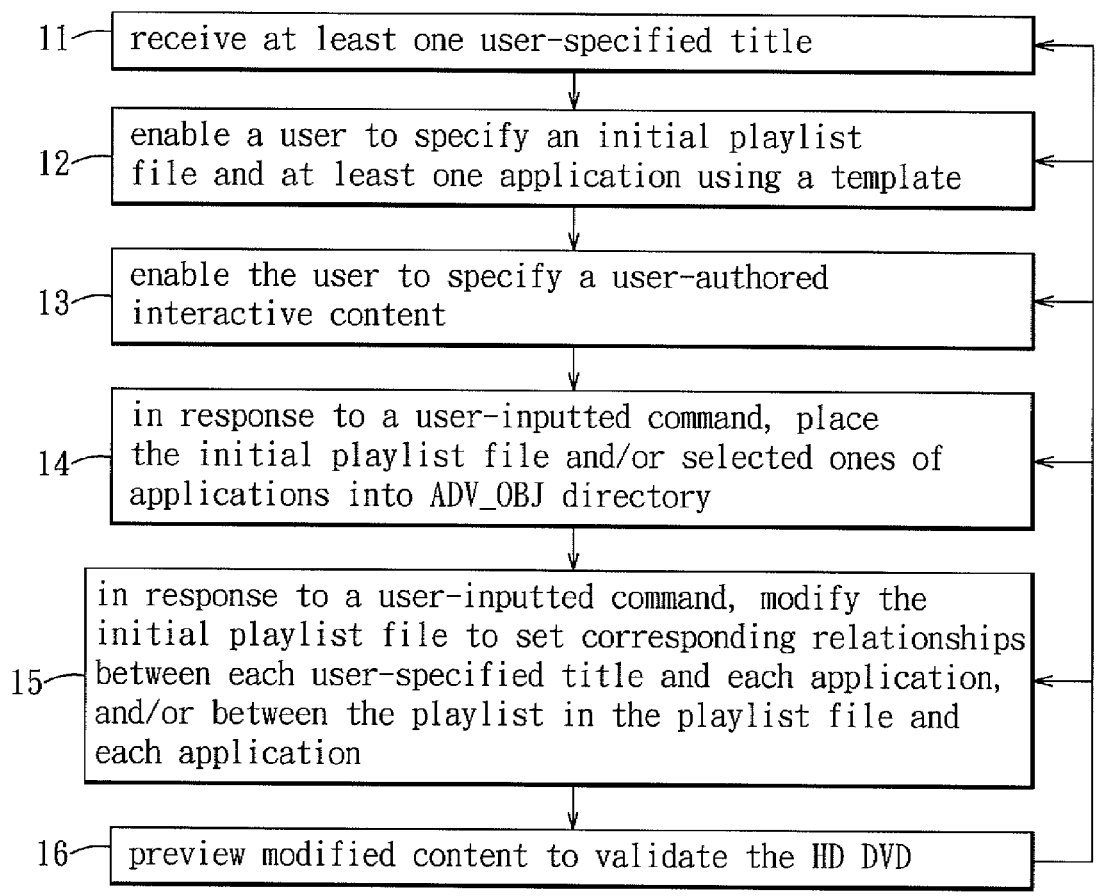
FIG. 3 is a flow chart of the first preferred embodiment of a machine-implemented authoring method for a HD DVD disc according to the present invention.

Referring to FIG. 3, the first preferred embodiment of a machine-implemented authoring method for a high definition digital versatile disc (HD DVD) according to the present invention includes the following steps.

In step 11 of the machine-implemented authoring method, at least one user-specified title is received. Each user-specified title includes a time map file and a set of video and/or image files.

In step 12 of the machine-implemented authoring method, a user is enabled to specify an initial playlist file and at least one application using a template. If the user chooses to use the template, an interactive content is generated and includes a template-generated raw playlist file as the initial playlist file and at least one template-generated application. The initial playlist file records file name and location of the time map file, and includes a playlist parameter segment and at least one title parameter segment corresponding in number to the user-specified title. Each of the playlist parameter segment and the title parameter segment stores a set of include parameters.

In step 13 of the machine-implemented authoring method, the user is enabled to specify a user-authored interactive content. The user-authored interactive content may include a user-authored raw playlist file and/or at least one user-authored application.

It should be noted herein that since the user may choose to generate an application using the template (the template-generated application) in step 12, and to provide a user-authored application in step 13, both a template-generated application and a user-authored application may be present at the end of step 13.

In step 14 of the machine-implemented authoring method, in response to a user-inputted command, one of the template-generated raw playlist file and the user-authored raw playlist file, and/or selected ones of the template-generated application and the user-authored application are placed in a directory named ADV_OBJ. It should be noted herein that the user may choose not to place any of the template-generated application and the user-authored application in the ADV_OBJ directory. The user may also choose to place both of the template-generated application and the user-authored application in the ADV_OBJ directory. Further, the user may choose to place the whole user-authored interactive content in the ADV_OBJ directory. Therefore, there is at least one initial playlist file, which is one of the template-generated raw playlist file and the user-authored raw playlist file, in the ADV_OBJ directory at the end of step 14.

In step 15 of the machine-implemented authoring method, in response to a user-inputted command, the initial playlist file is modified to set corresponding relationships between each user-specified title and each application, and/or between the playlist in the playlist file and each application, such that, during playback of each user-specified title and/or the playlist, the application set to correspond to the user-specified title and/or the playlist can be invoked and executed.

In this step, the user may modify the initial playlist file by modifying values of the include parameters in the playlist parameter segment and/or the title parameter segment of the initial playlist file manually and directly with reference to the "DVD specification for High Definition Video" provided by the DVD forum. In this approach, based on modifying content in the user-inputted command, the playlist parameter segment is modified such that the values of the include parameters in the playlist parameter segment correspond to names and locations of the include files in each application that corresponds to the playlist. The user also modifies each title parameter segment such that the values of the include parameters in the title parameter segment correspond to names and locations of the include files in each application that corresponds to the corresponding title.

In this step, the user may also be enabled to modify files other than the initial playlist file that are also located in the ADV_OBJ directory. For instance, the user may modify corresponding files of each application in the ADV_OBJ directory, regardless of whether the application is the template-generated application generated in step 12 or the user-authored application specified in step 13.

Furthermore, in step 16 of the machine-implemented authoring method, modified content thus authored can be previewed by the user to validate the HD DVD. If the user is unsatisfied with the modified content, the process may go back to step 11, 12, 13, 14 or 15 according to a user-inputted command, so as to modify the titles, applications, or the playlist file for setting the corresponding relationships between each title and each application, or between the playlist and each application.

It should be noted herein that the first preferred embodiment of the machine-implemented authoring method may also include an additional step, where the modified content is outputted and burned into a HD DVD disc upon receipt of a user-inputted command. Furthermore, orders of steps 12 and 13 can be interchanged in other embodiments of the present invention without affecting the final outcome.

Figure 4:
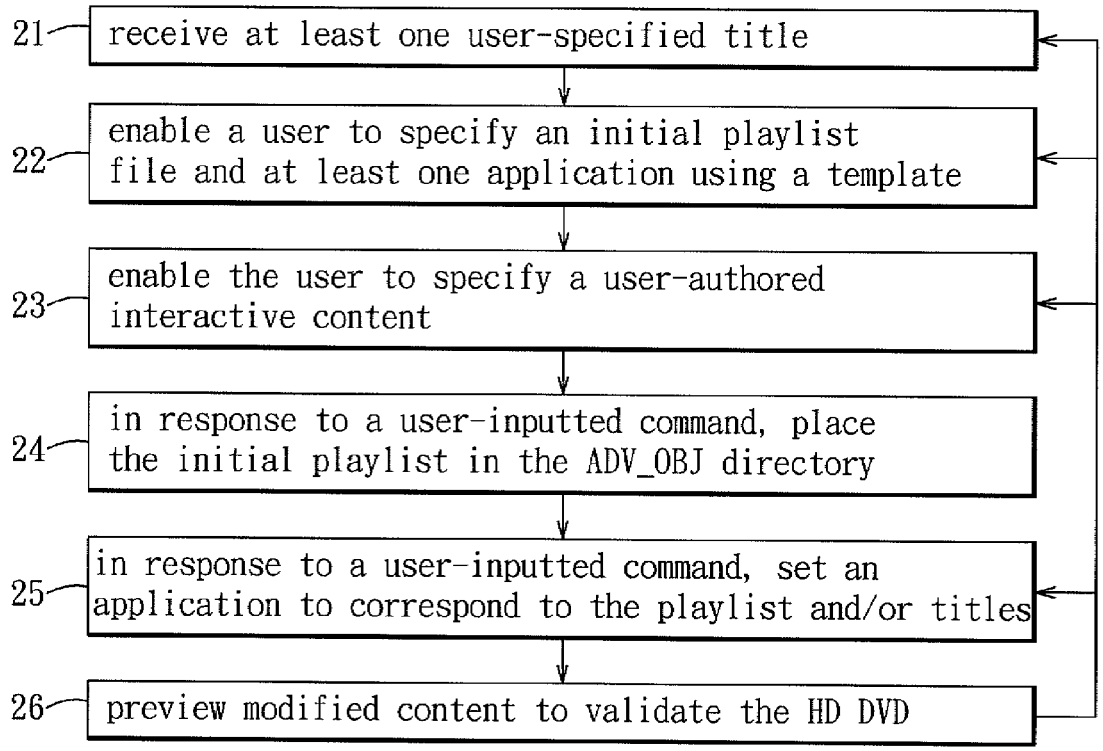
FIG. 4 is a flow chart of the second preferred embodiment of a machine-implemented authoring method for a HD DVD disc according to the present invention.

As shown in FIG. 4, the second preferred embodiment of a machine-implemented authoring method for a HD DVD disc according to the present invention differs from the first preferred embodiment mainly in the manner of modification of the initial playlist file for setting the corresponding relationships between the title and/or the playlist and the application.

The second preferred embodiment includes the following steps.

Since steps 21 to 23 of the machine-implemented authoring method according to the second preferred embodiment are identical to steps 11 to 13 of the previous embodiment, further details of the same are omitted herein for the sake of brevity.

In step 24 of the machine-implemented authoring method, in response to a user-inputted command, one of the template-generated raw playlist file and the user-authored raw playlist files is placed in the ADV_OBJ directory.

In step 25 of the machine-implemented authoring method, in response to a user-inputted command, an application, be it a template-generated application or a user-authored application, can be set to correspond to the playlist (i.e., to function as the playlist application), or to one or multiple ones of the titles (i.e., to function as the title application(s)).

In this step, the user does not modify the initial playlist file directly and manually in order to set the corresponding relationships between each title or the playlist and each application. Instead, the user is enabled to provide settings in the user-inputted command that define corresponding relationships between each application and each user-specified title and/or between each application and the whole playlist. In response, each application set to correspond to at least one of the user-specified titles and the playlist is placed in the ADV_OBJ directory, and the initial playlist file is modified according to the settings in the user-inputted command, such that, during playback of each user-specified title and/or the playlist, the application set to correspond to the user-specified title and/or the playlist can be invoked and executed.

In step 26 of the machine-implemented authoring method, modified content thus authored can be previewed by the user to validate the HD DVD. If the user is unsatisfied with the content, the process may go back to step 21, 22, 23 or 25 according to a user-inputted command to further modify the content.

It should be noted herein that the modified content can be outputted and burned into a HD DVD disc upon receipt of a user-inputted command once the user is satisfied with the modified content, as with the previous preferred embodiment.

This embodiment is to illustrate that the initial playlist file can be modified in various ways, including but not limited to being modified by the user directly and manually, and being modified through a user-inputted command for providing the desired settings.

Figure 5:
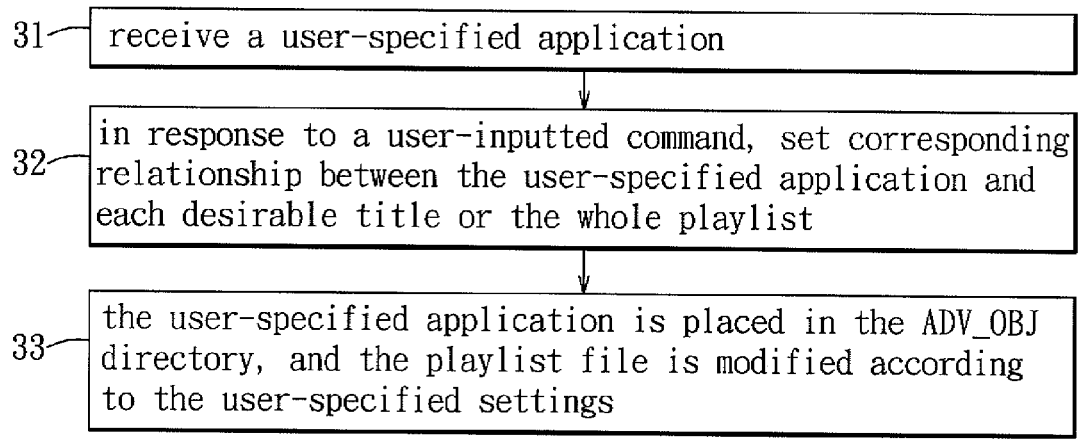
FIG. 5 is a flow chart of the third preferred embodiment of a machine-implemented authoring method for a HD DVD disc according to the present invention.

As shown in FIG. 5, a third preferred embodiment of the machine-implemented authoring method for a HD DVD according to the present invention is suitable when the user only wishes to add an application into a HD DVD project that already includes at least one title, and one playlist file such that the application can correspond to the at least one title, or to the whole playlist in the HD DVD project. In this embodiment, the machine-implemented authoring method starts in step 31 by receiving a user-specified application. Subsequently, in step 32 of the machine-implemented authoring method, in response to a user-inputted command, corresponding relationship between the user-specified application and each desirable title or the whole playlist is set. Next, in step 33, the user-specified application having corresponding relationships thus set is placed in the ADV_OBJ directory, and the playlist file is modified according to the user-specified settings, such that the user-specified application can be invoked and executed during playback of the corresponding title/playlist.

Before the fourth preferred embodiment of a machine-implemented authoring method for a HD DVD disc according to the present invention is described, it should be noted herein that text files (including the playlist file and/or the time map files of the applications) may contain attributes of the titles that correspond to the application. For example, an attribute denoting "playback duration of the title" of a corresponding title may have a value of "00:08:23:00". The values of the attributes of the titles in the text files need to be modified whenever there is a modification in the titles and/or in the corresponding relationships between the applications and the titles. For instance, when an interactive content corresponding to a set of titles in a HD DVD disc is applied to another set of titles for producing another HD DVD disc, or when a title that corresponds to an application is replaced by another title, the values of the attributes need to be changed individually according to the corresponding relationships between the titles and the interactive content/application.

Figure 6:
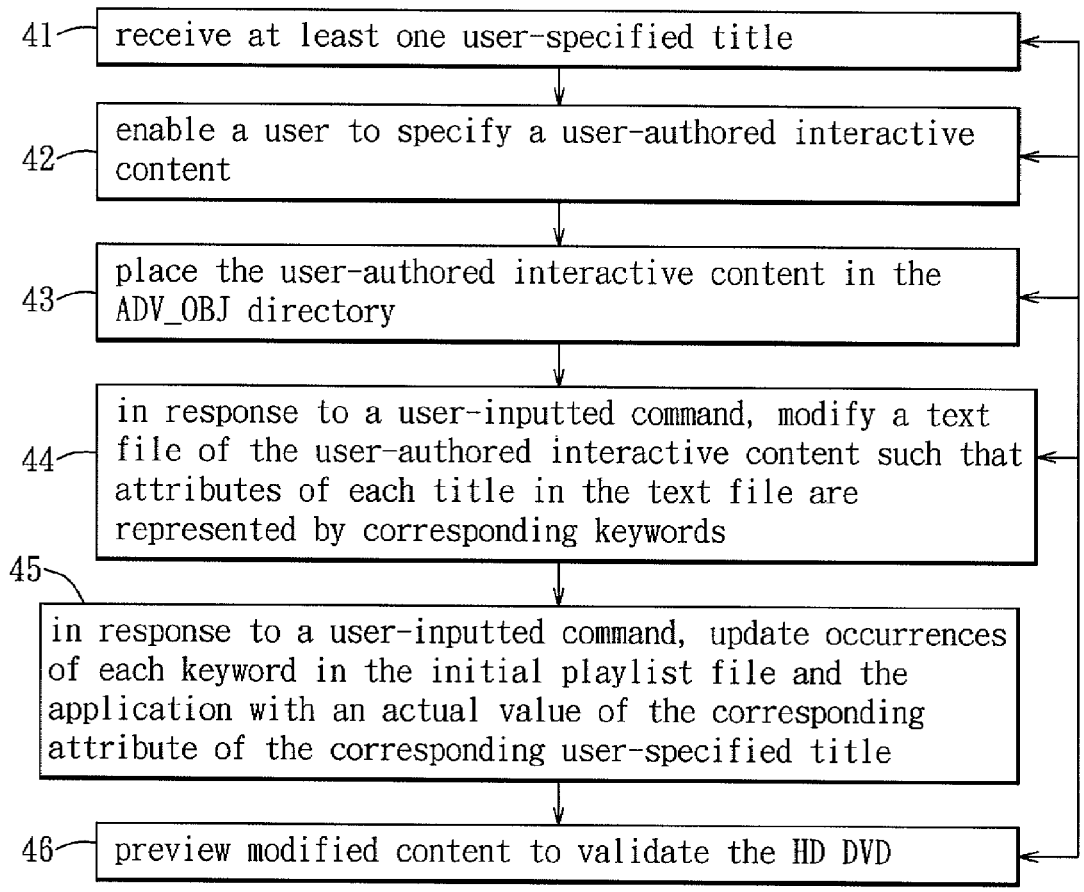
FIG. 6 is a flow chart of the fourth preferred embodiment of a machine-implemented authoring method for a HD DVD disc according to the present invention.

As shown in FIG. 6, to facilitate modification of the attributes in authoring a HD DVD disc, the fourth preferred embodiment of the machine-implemented authoring method according to the present invention is provided to include the following steps.

In step 41 of the machine-implemented authoring method, at least one user-specified title is received.

In step 42 of the machine-implemented authoring method, the user is enabled to specify a user-authored interactive content, which includes a playlist file and at least one application.

In step 43 of the machine-implemented authoring method, the user-authored interactive content is placed in the ADV_OBJ directory.

In step 44 of the machine-implemented authoring method, in response to a user-inputted command, a text file of the user-authored interactive content (e.g., the playlist file or text files of the application) is modified with reference to the DVD specification for High Definition Video and specific keywords, such that the attributes of each title in the text file are represented by corresponding specific keywords. In this step, all or some attributes of each title can be represented by the keywords. When only some attributes are represented by the keywords, actual values need to be inputted for those attributes that are not represented by the keywords. Examples of the specific keywords are listed in Table 1 below.

TABLE 1

| Keyword | Representation |
| --- | --- |
| #_Title.Count_# | Total number of title |
| #_Titlett.PrimaryAVMap_# | File name of a map file generated after encoding of Titlett |
| #_Titlett.Duration_# | Playback duration of Titlett |
| #_Titlett.-Frame:hh:mm:ss:ff:width×height_# | File name of a representative frame for Titlett, where "hh:mm:ss:ff" denotes a particular frame in time by (hour:minute:second:frame), and "width×height" denotes width and height of the representative frame |

In step 45 of the machine-implemented authoring method, in response to a user-inputted command, occurrences of each keyword in the initial playlist file and the application are updated with an actual value of the corresponding attribute of the corresponding user-specified title, so as to meet the HD DVD standard of accepting only actual values. Through the keyword representation mechanism, a simplified authoring method for a HD DVD disc is achieved.

Take an example as an illustration. If a user-specified title received in step 41, referred to as a first title title01, has a playback duration of 8 minutes and 23 seconds, and a keyword, #_Title01.Duration_#, is provided in step 44 of this preferred embodiment to represent the attribute of "playback duration" for the first title title01, then in step 45, occurrences of the keyword, #_Title01.Duration_#, are updated with the corresponding actual value of "00:08:23:00". Later, when the process goes back to step 41 and a new first title title01 is specified by the user with a playback duration of 1 hour and 15 minutes, the occurrences of the keyword, #_Title01.Duration_#, will be updated with "01:15:00:00" upon receipt of a user-inputted command in step 45.

In addition, another keyword, such as #_Titlett.Frame:hh:mm:ss:ff:width×height_.#, can also be provided in this embodiment to represent the attribute of "a representative frame for titlett", which is also referred to as a "title frame" for titlett. The title frame is a still image for representing a title to enable grasping of the content of the title by the audience, and may be an image of a motion picture at a particular point in time.

In step 46 of the machine-implemented authoring method, modified content thus authored can be previewed by the user to validate the HD DVD. If the user is unsatisfied with the content, the process may go back to step 41, 42, 43 or 44 according to a user-inputted command to further modify the content of the HD DVD.

As with the previous embodiments, the modified content may be outputted and burned into a HD DVD disc upon receipt of a user-inputted command once the user is satisfied with the modified content. In addition, orders of steps 41 and 42 may be interchanged in other embodiments of the present invention.

Furthermore, application of the keyword representation mechanism is not limited to the user-authored interactive content. The keyword representation mechanism may also be applied to the template-generated interactive content. For instance, step 15 of the first preferred embodiment may be replaced with steps 44 and 45 to further enhance convenience and simplicity of authoring a HD DVD.

The keyword representation mechanism according to the fourth preferred embodiment does not require the user to check the actual values of the attributes in the text files. Moreover, for a user who wishes to use the same interactive content for another title, since the attributes of corresponding titles are already represented by the keywords, respectively, the machine-implemented authoring method can simply receive different titles, and in response to a user-inputted command, update occurrences of each keyword in the text file with an actual value of the attribute of the corresponding title. The machine-implemented authoring method may also enable a user to specify a text file, allowing modification of the keywords for corresponding attributes, prior to receiving the different titles.

Furthermore, if the user is unsatisfied with the modified content after performing the steps of a particular embodiment, he may choose to jump to a step of another embodiment presented hereinforth. For instance, the machine-implemented authoring method may proceed to step 11 or 21 after performing step 45.

The computer-readable storage medium of the present invention includes program instructions for causing a computing apparatus to execute consecutive steps of the machine-implemented authoring method for a HD DVD disc according to the previous embodiments.

In sum, the machine-implemented authoring method for a HD DVD disc allows a user to specify titles and interactive contents, provides the user with templates for generating interactive contents, and enables the user to modify the interactive content in manners described above, where a set of keywords may be used to represent attributes of corresponding titles in text files, such as the playlist file or text files of the applications, and the occurrences of the keywords are updated with actual values of the attributes upon receipt of a user-inputted command, such that convenient and simple authoring is available to general consumers.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A machine-implemented authoring method for a high definition digital versatile disc (HD DVD) utilizing an interactive application for the HD DVD, comprising:
   a) receiving a user-specified title of a video;
   b) enabling a user to specify an initial playlist file and at least one application for the HD DVD, the initial playlist file being one of a template-generated raw playlist file and a user-authored raw playlist file, the at least one application for the HD DVD including interactive content comprising one or both of receiving user inputs and displaying prompt messages; and
   c) in response to a user-inputted command, modifying the initial playlist file to set a corresponding relationship between the user-specified title and said at least one application for the HD DVD such that, during playback of the video having the user-specified title using the HD DVD, said at least one interactive application set to correspond to the user-specified title can be invoked and executed, wherein execution of the application includes allowing an audience of the video playback to simultaneously interact with the application in real-time via one or both of the user inputs and the prompt messages without interrupting playback of the video.

2. The machine-implemented authoring method as claimed in claim 1, further comprising, between steps b) and c), placing the initial playlist file and said at least one application in a directory.

3. The machine-implemented authoring method as claimed in claim 1, wherein, in step b), the initial playlist file is a template-generated raw playlist file.

4. The machine-implemented authoring method as claimed in claim 1, wherein the initial playlist file is generated in step b).

5. The machine-implemented authoring method as claimed in claim 1, wherein, in step b), the initial playlist file is a user-authored raw playlist file.

6. The machine-implemented authoring method as claimed in claim 1, wherein, in step b), said at least one application is a user-authored application.

7. The machine-implemented authoring method as claimed in claim 1, further comprising, after step c), previewing modified content of step c) to validate the HD DVD.

8. The machine-implemented authoring method as claimed in claim 1, wherein:
   the user-specified title includes a time map file, and the initial playlist file records file name and location of the time map file, and includes a playlist parameter segment and at least one title parameter segment; and
   modifying to set the corresponding relationship in step c) includes at least one of modifying the playlist parameter segment such that value of an include parameter in the playlist parameter segment corresponds to name and location of an include file in said at least one application that corresponds to the user-specified title, and
   modifying said at least one title parameter segment such that value of an include parameter in said at least one title parameter segment corresponds to name and location of an include file in said at least one application that corresponds to the user-specified title.

9. The machine-implemented authoring method as claimed in claim 1, wherein, in step c), said at least one application is modified according to attributes of the user-specified title that corresponds to said at least one application.

10. The machine-implemented authoring method as claimed in claim 1, wherein, in step c), the initial playlist file is modified according to modifying content in the user-inputted command.

11. The machine-implemented authoring method as claimed in claim 1, wherein the corresponding relationship is modified in step c) according to settings in the user-inputted command, and is at least one of the relationship of the user-specified title with said at least one application, and the relationship of a playlist in the playlist file with said at least one application.

12. The machine-implemented authoring method as claimed in claim 1, wherein an attribute of the user-specified title is represented by a keyword in at least one of the initial playlist file and said at least one application,
   the machine-implemented authoring method further comprising, after step c), in response to another user-inputted command, updating occurrences of the keyword in said at least one of the initial playlist file and said at least one application with actual values of the attribute of the user-specified title.

13. The machine-implemented authoring method as claimed in claim 1, wherein the application includes interactive content to be simultaneously rendered along with media content associated with the title.

14. A machine-implemented authoring method adapted for use when adding an interactive application to a high definition digital versatile disc (HD DVD) project, the project including at least one title of a video and a playlist file, said machine-implemented authoring method comprising:
 a) receiving the application, the application for the HD DVD including interactive content comprising one or both of receiving user inputs and displaying prompt messages;
 b) in response to a user-inputted command, setting a corresponding relationship between the application and the title for the HD DVD; and
 c) modifying the playlist file according to the corresponding relationship thus set such that the interactive application can be invoked and executed during playback of the video having the title using the HD DVD, wherein execution of the application includes allowing an audience of the video playback to simultaneously interact with the application in real-time via one or both of the user inputs and the prompt messages without interrupting playback of the video.

15. The machine-implemented authoring method as claimed in claim 14, wherein the application includes interactive content to be simultaneously rendered along with media content associated with the title.

16. A non-transitory computer-readable storage medium comprising program instructions for causing a computing apparatus to execute consecutive steps of a machine-implemented authoring method for a high definition digital versatile disc (HD DVD) utilizing an interactive application for the HD DVD, said machine-implemented authoring method comprising:
 a) receiving a user-specified title of a video;
 b) enabling a user to specify an initial playlist file and at least one application for the HD DVD, the initial playlist file being one of a template-generated raw playlist file and a user-authored raw playlist file, the at least one application for the HD DVD including interactive content comprising one or both of receiving user inputs and displaying prompt messages; and
 c) in response to a user-inputted command, modifying the initial playlist file to set a corresponding relationship between the user-specified title and said at least one application for the HD DVD such that, during playback of the video having the user-specified title using the HD DVD, said at least one interactive application set to correspond to the user-specified title can be invoked and executed, wherein execution of the application includes allowing an audience of the video playback to simultaneously interact with the application in real-time via one or both of the user inputs and the prompt messages without interrupting playback of the video.

17. The non-transitory computer-readable storage medium as claimed in claim 16, wherein said machine-implemented authoring method further comprises, between steps b) and c) placing the initial playlist file and said at least one application in a directory.

18. The non-transitory computer-readable storage medium as claimed in claim 16, wherein, in step b), the initial playlist file is a template-generated raw playlist file generated by the computing apparatus.

19. The non-transitory computer-readable storage medium as claimed in claim 16, wherein the initial playlist file is generated by the computing apparatus in step b).

20. The non-transitory computer-readable storage medium as claimed in claim 16, wherein, in step b), the initial playlist file is a user-authored raw playlist file.

21. The non-transitory computer-readable storage medium as claimed in claim 16, wherein, in step b), said at least one application is a user-authored application.

22. The non-transitory computer-readable storage medium as claimed in claim 16, wherein said machine-implemented authoring method further comprises, after step c), previewing modified content of step c) to validate the HD DVD.

23. The non-transitory computer-readable storage medium as claimed in claim 16, wherein:
 the user-specified title includes a time map file, and the initial playlist file records file name and location of the time map file, and includes a playlist parameter segment and at least one title parameter segment; and
 modifying to set the corresponding relationship in step c) of said machine-implemented authoring method includes at least one of
 modifying the playlist parameter segment such that value of an include parameter in the playlist parameter segment corresponds to name and location of an include file in said at least one application that corresponds to the user-specified title, and
 modifying said at least one title parameter segment such that value of an include parameter in said at least one title parameter segment corresponds to name and location of an include file in said at least one application that corresponds to the user-specified title.

24. The non-transitory computer-readable storage medium as claimed in claim 16, wherein, in step c), said at least one application is modified according to attributes of the user-specified title that corresponds to said at least one application.

25. The non-transitory computer-readable storage medium as claimed in claim 16, wherein, in step c), the initial playlist file is modified according to modifying content in the user-inputted command.

26. The non-transitory computer-readable storage medium as claimed in claim 16, wherein the corresponding relationship is modified in step c) according to settings in the user-inputted command, and is at least one of the relationship of the user-specified title with said at least one application, and the relationship of a playlist in the playlist file with said at least one application.

27. The non-transitory computer-readable storage medium as claimed in claim 16, wherein an attribute of the user-specified title is represented by a keyword in at least one of the initial playlist file and said at least one application,
 said machine-implemented authoring method further comprising, after step c), in response to another user-inputted command, updating occurrences of the keyword in said at least one of the initial playlist file and said at least one application with actual values of the attribute of the user-specified title.

28. The non-transitory computer-readable storage medium as claimed in claim 16, wherein the application includes interactive content to be simultaneously rendered along with media content associated with the title.

29. A non-transitory computer-readable storage medium comprising program instructions for causing a computing apparatus to execute consecutive steps of a machine-implemented authoring method for adding an interactive application to a high definition digital versatile disc (HD DVD)

project, the project including at least one title of a video and a playlist file, said machine-implemented authoring method comprising:

a) receiving the application, the application for the HD DVD including interactive content comprising one or both of receiving user inputs and displaying prompt messages;

b) in response to a user-inputted command, setting a corresponding relationship between the application and the title for the HD DVD; and c) modifying the playlist file by the computing apparatus according to the corresponding relationship thus set such that the interactive application can be invoked and executed during playback of the video having the title using the HD DVD, wherein execution of the application includes allowing an audience of the video playback to simultaneously interact with the application in real-time via one or both of the user inputs and the prompt messages without interrupting playback of the video.

30. The non-transitory computer-readable storage medium as claimed in claim 29, wherein the application includes interactive content to be simultaneously rendered along with media content associated with the title.

\* \* \* \* \*